(12) United States Patent
Kang et al.

(10) Patent No.: US 9,666,158 B2
(45) Date of Patent: May 30, 2017

(54) APPARATUS AND METHOD OF CONTROLLING SCREENS IN A DEVICE

(71) Applicant: Samsung Electronics Co., Ltd., Suwon-si, Gyeonggi-do (KR)

(72) Inventors: Doo-Suk Kang, Suwon-si (KR); Kwang-Weon Park, Suwon-si (KR); Seung-Soo Woo, Suwon-si (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 14/162,191

(22) Filed: Jan. 23, 2014

(65) Prior Publication Data

US 2014/0285422 A1 Sep. 25, 2014

(30) Foreign Application Priority Data

Mar. 25, 2013 (KR) .......................... 10-2013-0031497

(51) Int. Cl.
*G06F 3/048* (2013.01)
*G09G 5/00* (2006.01)
*G09G 5/34* (2006.01)
*G06F 3/0488* (2013.01)
*G06F 3/14* (2006.01)
(Continued)

(52) U.S. Cl.
CPC ........... *G09G 5/003* (2013.01); *G06F 3/0485* (2013.01); *G06F 3/04883* (2013.01); *G06F 3/1454* (2013.01); *G09G 5/34* (2013.01); *G06F 2203/04804* (2013.01); *G09G 5/14* (2013.01)

(58) Field of Classification Search
CPC ................ G09G 3/2092; G06F 3/0481; G06F 2203/04804
USPC ..... 345/87, 204; 348/42; 715/790, 794, 795, 715/796, 797
See application file for complete search history.

(56) References Cited

U.S. PATENT DOCUMENTS 5,517,021 A * 5/1996 Kaufman ............... A61B 3/113
250/221
5,651,107 A * 7/1997 Frank .................... G06F 3/0481
345/589
5,689,666 A 11/1997 Berquist et al.
(Continued)

FOREIGN PATENT DOCUMENTS

EP 2372513 A2 10/2011
KR 10-0791417 B1 12/2007
(Continued)

OTHER PUBLICATIONS

"Maran Illustrated Windows 7," Ruth Maran, Oct. 1, 2009, p. 23, 24 and 26.*
(Continued)

*Primary Examiner* — Matthew Ell
(74) *Attorney, Agent, or Firm* — Jefferson IP Law, LLP

(57) ABSTRACT

An apparatus and a method of controlling screens in a device are provided. The apparatus includes a display configured to include a first screen and a second screen overlapped over the first screen, and a controller configured to control display of partial information of the first screen hidden by the second screen to be viewable by changing an attribute of the second screen, upon detecting a gesture on the second screen while information is being displayed separately on the first and second screens.

18 Claims, 21 Drawing Sheets

(51) Int. Cl.
    *G06F 3/0485*     (2013.01)
    *G09G 5/14*     (2006.01)

(56) References Cited

U.S. PATENT DOCUMENTS

| | | |
|---|---|---|
| 2002/0015064 A1 | 2/2002 | Robotham et al. |
| 2006/0061597 A1 | 3/2006 | Hui |
| 2007/0083825 A1 | 4/2007 | Chaudhri et al. |
| 2007/0132720 A1 | 6/2007 | Kang |
| 2008/0012835 A1* | 1/2008 | Rimon .................... G06F 3/038 345/173 |
| 2008/0195969 A1 | 8/2008 | Brown et al. |
| 2009/0007012 A1 | 1/2009 | Mandic et al. |
| 2009/0317050 A1 | 12/2009 | Son et al. |
| 2012/0166989 A1 | 6/2012 | Brown et al. |

FOREIGN PATENT DOCUMENTS

| | | |
|---|---|---|
| KR | 10-2009-0039951 A | 4/2009 |
| KR | 10-2009-0041784 A | 4/2009 |
| KR | 10-2011-0072134 A | 6/2011 |

OTHER PUBLICATIONS

"Maran Illustrated Windows 7," Ruth Maran, Oct. 1, 2009, p. 20 and 28.*

* cited by examiner

APPARATUS AND METHOD OF CONTROLLING SCREENS IN A DEVICE

CROSS-REFERENCE TO RELATED APPLICATION(S)

This application claims the benefit under 35 U.S.C. §119 (a) of a Korean patent application filed on Mar. 25, 2013 in the Korean Intellectual Property Office and assigned Serial No. 10-2013-0031497, the entire disclosure of which is hereby incorporated by reference.

TECHNICAL FIELD

The present disclosure relates to an apparatus and a method of controlling screens in a device. More particularly, the present disclosure relates to an apparatus and a method of controlling a plurality of screens which separately display information based on at least one application in a device.

BACKGROUND

Recently, devices have been equipped with a pop-up window function for displaying other information on an additional window, while displaying information based on an executed application on a screen.

With the pop-up window function, a user can view different pieces of information at the same time. For example, while executing an Internet application on a screen of a device, the user may view a video on an additional window.

However, as the additional window displayed by the pop-up window function is overlapped with the screen of the device, the user should manually move the additional window to an intended position in order to view information displayed on the screen but hidden by the additional window, which results in an inconvenience to the user.

Therefore, a need exists for an apparatus and a method of controlling a plurality of screens which separately display information based on at least one application in a device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method of controlling a plurality of screens which separately display information based on at least one application in a device.

Another aspect of the present disclosure is to provide an apparatus and a method of, when information based on at least one application is being displayed separately on a plurality of screens, enabling a user to view information displayed on one screen but hidden by another screen overlapped over the one screen by changing an attribute of the other screen in a device.

In accordance with an aspect of the present disclosure, an apparatus for controlling screens in a device is provided. The apparatus includes a display configured to include a first screen and a second screen overlapped over the first screen, and a controller configured to control display of partial information of the first screen hidden by the second screen to be viewable by changing an attribute of the second screen, upon detecting a gesture on the second screen while information is being displayed separately on the first and second screens.

In accordance with another aspect of the present disclosure, an apparatus for controlling screens in a device is provided. The apparatus includes a display configured to include a first screen and a second screen overlapped over the first screen, and a controller configured to, while information based on a first application is being displayed on the first screen and information based on a second application is being displayed on the second screen, upon detecting a hovering gesture, determine whether the hovering gesture has been generated on the second screen based on coordinates of a position of the hovering gesture, determine a type of the hovering gesture, if the hovering gesture has been generated on the second screen, control display of partial information of the first screen hidden by the second screen to be viewable by moving the second screen out of a currently displayed area of the second screen, if the determined type of the hovering gesture is a request for moving the second screen, and control returning of the second screen to a previous displayed area or keep the second screen in a currently displayed area, if the partial information of the first screen is completely viewed.

In accordance with another aspect of the present disclosure, a method of controlling screens in a device is provided. The method includes displaying information based on at least one application separately on first and second screens, and displaying partial information of the first screen hidden by the second screen to be viewable by changing an attribute of the second screen, upon detecting a gesture on the second screen while the information based on the at least one application separately on the first and second screens. The second screen is displayed overlapped over the first screen.

In accordance with another aspect of the present disclosure, a method of controlling screens in a device is provided. The method includes displaying information based on a first application on a first screen and displaying information based on a second application on a second screen overlapped over the first screen, determining whether a hovering gesture has been generated on the second screen based on coordinates of a position of the hovering gesture, upon detecting the hovering gesture while the information based on the first application is being displayed on the first screen and the information based on the second application is being displayed on the second screen, determining a type of the hovering gesture, if the hovering gesture has been generated on the second screen, displaying partial information of the first screen hidden by the second screen to be viewable by moving the second screen out of a currently displayed area of the second screen, if the determined type of the hovering gesture is a request for moving the second screen, and returning the second screen to a previous displayed area or keeping the second screen in a currently displayed area, if the partial information of the first screen is completely viewed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
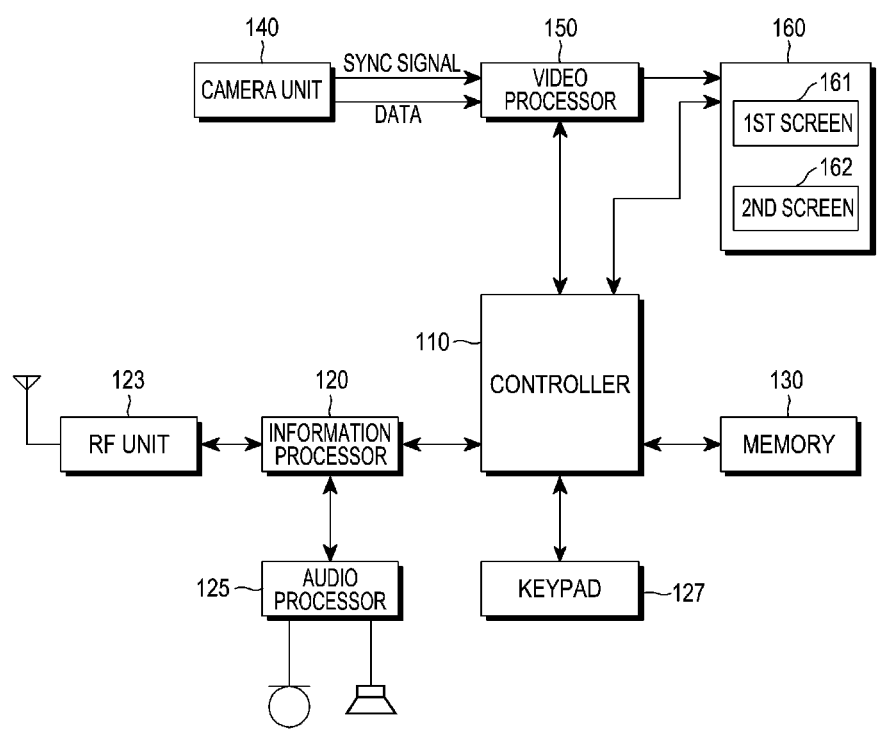
FIG. 1 is a block diagram of a device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure will be provided to achieve the above-described technical aspects of the present disclosure. In an implementation, defined entities may have the same names, to which the present disclosure is not limited. Thus, various embodiments of the present disclosure can be implemented with same or ready modifications in a system having a similar technical background.

In an embodiment of the present disclosure, a device is a portable terminal or a fixed terminal. A portable terminal refers to an electronic device configured to be carried readily with a user. The term 'portable terminal' covers a broad range of devices including a video phone, a portable phone, a smart phone, a Wideband Code Division Multiple Access (WCDMA) terminal, a Universal Mobile Telecommunications System (UMTS) terminal, a Personal Digital Assistant (PDA), a Portable Multimedia Player (PMP), a Digital Multimedia Broadcasting (DMB) terminal, an e-book reader, a laptop computer, a tablet, and a digital camera. The fixed terminal may be, but is not limited to, a desktop Personal Computer (PC).

In various embodiments of the present disclosure, a second screen is displayed overlapped over a first window. If the first and second windows are regarded as layers, the first and second windows may be referred to as an underlying layer and an overlying layer, respectively.

The second screen may also be referred to as an additional window that may be displayed overlapped over the first screen.

The following description is given of control of a movement of the second screen in various embodiments of the present disclosure with the appreciation that information based on a plurality of applications, for example, information based on a first application and information based on a second application are respectively displayed on the first and second screens. However, this is merely an implementation of various embodiments of the present disclosure. Thus, it may be contemplated as another embodiment that with a background image displayed on the first screen and information based on a specific application displayed on the second screen, the movement of the second screen is controlled.

FIG. 1 is a block diagram of a device according to an embodiment of the present disclosure.

Referring to FIG. 1, a Radio Frequency (RF) unit 123 performs the wireless communication functionality of the device. The RF unit 123 includes an RF transmitter that upconverts the frequency of a transmission signal and amplifies the upconverted transmission signal and an RF receiver that low-noise-amplifies a received signal and downconverts the frequency of the low-noise-amplified signal. An information processor 120 includes a transmitter that encodes and modulates the transmission signal and a receiver that demodulates and decodes the received signal. Therefore, the information processor 120 may include a Modulator-Demodulator (MODEM) and a Coder-Decoder (CODEC). The CODEC includes a data CODEC to process packet information and an audio CODEC to process an audio signal, such as a voice. An audio processor 125 reproduces a received audio signal output from the audio CODEC of the information processor 120 or transmits a transmission audio signal generated from a microphone to the audio CODEC of the information processor 120.

A keypad 127 includes alphanumerical keys to input numbers and characters and functions keys to set functions.

A memory 130 may include a program memory and an information memory. The program memory may store programs that control general operations of the device and programs that control display of partial information of the first screen hidden by the second screen so that the partial information is viewable on the first screen, by changing an attribute (e.g., a position, a size, a transparency, or the like) of the second screen. The information memory temporarily stores information generated during execution of the programs.

A controller 110 provides overall control to the device.

In an embodiment of the present disclosure, while information based on at least one application is being displayed separately on the first and second screens, upon detecting a specific gesture on the second screen, the controller 110 controls display of partial information of the first screen hidden by the second screen by changing an attribute of the second screen, so that the partial information is viewable on the first screen.

Attributes of the second screen include at least one of a position, a size, or a transparency of the second screen.

The specific gesture detected on the second screen may be at least one of a hovering gesture, a gesture of inputting a specific key in the device, a motion gesture of the device, a touch, a user's motion detected by infrared rays, a user's eye movement, and the like. The hovering gesture is to hold a touch pen above a screen in a non-contact manner by a gap for a certain period of time. Herein, a button of the touch pen may be kept pressed for a certain period of time. Accordingly, when the user makes a hovering gesture with the touch pen to change an attribute of the second screen, the user may or may not press the button of the touch pen according to the user's presetting.

In an embodiment of the present disclosure, upon detecting a request for moving the second screen triggered by changing an attribute of the second screen, the controller 110 may express the movement of the second screen through a User Interface (UI) that gives a bouncy effect to the second screen by applying a physical engine algorithm that makes two objects having the same polarity repel each other.

In an embodiment of the present disclosure, while information based on the first application and information based on the second application are being displayed respectively on the first and second screens, upon detecting a hovering gesture above the second screen, the controller 110 controls movement of the second screen out of a currently displayed area so that partial information of the first screen hidden by the second screen is viewable on the first screen.

If the user finishes viewing the partial information on the first screen, the controller 110 returns the second screen to the previous displayed area or keeps the second screen in a currently displayed area.

While the partial information hidden by the second screen is being displayed on the first screen by moving the second screen out of the currently displayed area, upon detecting an input gesture or an information movement gesture on the first screen or if no gesture is detected on the first screen for a certain period of time, the controller 110 may determine that the user has finished viewing the partial information of the first screen. Alternatively or additionally, when confirming that the user has turned his or her gaze toward a different position by eye tracking, the controller 110 may determine that the user has finished viewing the partial information of the first screen.

Accordingly, if an input gesture or an information movement gesture is detected on the first screen, no input gesture is detected on the first screen for a certain period of time, or a user's gaze change is detected by eye tracking, it may be determined that the partial information of the first screen has been viewed completely in the embodiment of the present disclosure.

In the embodiment of the present disclosure, while information based on the first application and information based on the second application are being displayed respectively on the first and second screens, upon detecting a hovering gesture above the second screen, the controller 110 may control display of partial information of the first screen hidden by the second screen by increasing the transparency of the second screen, so that the partial information shows through the more transparent second screen. Herein, the controller 110 may increase the transparency of a partial area around the coordinates of a position of the second screen at which the hovering gesture has been detected or the transparency of the entire area of the second screen.

If the user finishes viewing the partial information on the first screen, the controller 110 returns the second screen to a previous transparency level.

While the partial information of the first screen hidden by the second screen is shown through the second screen by increasing the transparency of the second screen, upon detecting an input gesture or an information movement gesture on the first screen or if no gesture is detected on the first screen for a certain period of time, the controller 110 may determine that the user has finished viewing the partial information of the first screen. Alternatively or additionally, when confirming that the user has turned his or her gaze toward a different position by eye tracking, the controller 110 may determine that the user has finished viewing the partial information of the first screen.

In another embodiment of the present disclosure, while information based on the first application and information based on the second application are being displayed respectively on the first and second screens, upon detecting a scroll-up/down of the first screen until lowermost/uppermost information based on the first application is scrolled up/down on the first screen, the controller 110 detects a currently displayed area of the second screen. If the controller 110 determines that the second screen is positioned in a lower/upper area of the first screen, the controller 110 controls information in the lower/upper area of the first screen not to be overlapped with the second screen by further scrolling up/down a bottom boundary of the first screen to or above/below a top/bottom boundary of the second screen.

In the second embodiment of the present disclosure, while information based on the first application and information based on the second application are being displayed respectively on the first and second screens, upon detecting a scroll-up/down of the first screen until lowermost/uppermost information based on the first application is scrolled up/down on the first screen, the controller 110 detects a currently displayed area of the second screen. If the controller 110 determines that the second screen is positioned in a lower/upper area of the first screen, the controller 110 controls information in the lower/upper area of the first screen not to be overlapped with the second screen by moving the second screen out of the currently displayed area.

In the second embodiment of the present disclosure, while information based on the first application and information based on the second application are being displayed respectively on the first and second screens, upon detecting a scroll-up/down of the first screen until lowermost/uppermost information based on the first application is scrolled up/down on the first screen, the controller 110 detects a currently displayed area of the second screen. If the controller 110 determines that the second screen is positioned in a lower/upper area of the first screen, the controller 110 controls display of information hidden by the second screen in the lower/upper area of the first screen by increasing the transparency of the second screen so that the information in the lower/upper area of the first screen shows through the more transparent second screen.

In the second embodiment of the present disclosure, while information based on the first application and information based on the second application are being displayed respectively on the first and second screens, upon detecting a leftward/rightward scroll of the first screen until rightmost/leftmost information based on the first application moves into a left/right area of the first screen defined with respect to a reference line of the first screen, the controller 110 detects a currently displayed area of the second screen. If the controller 110 determines that the second screen is positioned across the reference line of the first screen, the controller 110 controls information in the left/right area of the first screen not to be overlapped with the second screen by moving the second screen to the right/left area of the first screen opposite to the left/right area of the first screen in which the rightmost/leftmost information based on the first application is located and adjusting the size of the second screen according to the size of the right/left area of the first screen.

In a third embodiment of the present disclosure, while information based on the first application and information based on the second application are being displayed respectively on the first and second screens, upon detecting display of a pop-up window on the first screen, the controller 110 detects a currently displayed area of the second screen. If the controller 110 determines that the second screen is overlapped over the pop-up window, the controller 110 controls the pop-up window not to be overlapped with the second screen by moving the second screen out of the displayed area of the pop-up window. The pop-up window may be a menu pop-up window including menu types by which to execute functions, a notification pop-up window including a notification text message, or the like.

In the third embodiment of the present disclosure, while information based on the first application and information based on the second application are being displayed respectively on the first and second screens, upon detecting display of a pop-up window on the first screen, the controller 110 detects a currently displayed area of the second screen. If the controller 110 determines that the second screen is overlapped over the pop-up window, the controller 110 increases the transparency of the second screen so that partial information of the pop-up window hidden by the second screen shows through the more transparent second screen.

In a fourth embodiment of the present disclosure, while information based on a first application and information based on a second application are being displayed respectively in first and second areas of the first screen and information based on a third application is being displayed on the second screen, the controller 110 determines whether the first and second applications have been activated. If the first application is active and the second screen is positioned over the first area, the controller 110 controls movement of the second screen to the second area of the first screen. If the size of the first area is changed, the controller 110 also adjusts the size of the second screen according to the changed size of the first area. Herein, the size of the second screen is adjusted to be smaller than the size of the first area. If the second application is active and the second screen is positioned over the second area, the controller 110 controls movement of the second screen to the first area of the first screen. If the size of the second area is adjusted, the controller 110 also adjusts the size of the second screen according to the changed size of the second area. Herein, the size of the second screen is adjusted to be smaller than the size of the second area.

In a fifth embodiment of the present disclosure, while information based on a first application and information based on a second application are being displayed respectively on the first and second screens, upon detecting an input gesture on an input window of the first screen, the controller 110 detects a currently displayed area of the second screen. If the second screen is overlapped over the input window or a keypad displayed by the input gesture, the controller 110 controls the input window and the keypad not to be overlapped with the second screen by moving the second screen out of the displayed areas of the input window and the keypad or adjusting the size of the second screen.

In an embodiment of the present disclosure, while information based on a first application and information based on a second application are being displayed respectively on the first and second screens, upon detecting a hovering gesture, the controller 110 determines whether the hovering gesture has been generated above the second screen, based on the coordinates of the position of the hovering gesture. If the hovering gesture has been generated above the second screen, the controller 110 determines the type of the hovering gesture. If the type of the hovering gesture is a request for moving the second screen, the controller 110 moves the second screen from a currently displayed area so that partial information of the first screen hidden by the second screen is viewable on the first screen. When the user has finished viewing the partial information on the first screen, the controller 110 returns the second screen to the previous displayed area or keeps the second screen in a currently displayed area.

On the other hand, if the controller 110 determines that the hovering gesture has been generated above the first screen, based on the coordinates of the position of the hovering gesture, the controller 110 controls the information based on the first application on the first screen.

If it is determined based on the type of the hovering gesture that the hovering gesture is a command to control the second screen, the controller 110 controls the information based on the second application on the second screen in response to the command to control the second screen.

A camera unit 140 captures image information and includes a camera sensor that converts a captured optical signal to an electrical signal and a signal processor that converts an analog image signal captured by the camera sensor to digital information. It is assumed herein that the camera sensor is a Charge Coupled Device (CCD) sensor or a Complementary Metal Oxide Semiconductor (CMOS) sensor. The camera sensor and the signal processor may be integrated into a single device or separately configured.

A video processor 150 performs Image Signal Processing (ISP) on an image signal received from the camera unit 140 in order to display an image on a display 160. ISP functions include gamma correction, interpolation, spatial change, image effects, image scaling, Automatic White Balance (AWB), Automatic Exposure (AE), Automatic Focus (AF), and the like. Therefore, the video processor 150 processes the image signal received from the camera unit 140 on a frame basis and outputs frame image information according to the characteristics and size of the display 160. The video processor 150 includes a video CODEC that compresses frame image information to be displayed on the display 160 in a certain scheme or decompresses compressed frame image information to original frame image information. The video CODEC may be a Joint Photographic Experts Group (JPEG) CODEC, a Moving Picture Experts Group 4 (MPEG4) CODEC, a Wavelet CODEC, or the like. It is assumed that the video processor 150 has an On Screen Display (OSD) function. Thus, the video processor 150 may output OSD information according to the size of a screen that will display the OSD information, under the control of the controller 110.

The display 160 displays an image signal received from the video processor 150 on a screen and also displays user information received from the controller 110. The display 160 may be configured as a Liquid Crystal Display (LCD). In this case, the display 160 may include an LCD controller, a memory to store image information, and an LCD device. If the LCD is configured in a touch screen fashion, keys as included in the keypad 127 may be displayed on the display 160.

As the display 160 is configured as a touch screen unit, the touch screen unit includes a Touch Screen Panel (TSP) with a plurality of sensor panels. The plurality of sensor panels may include a capacitive sensor panel that detects a hand touch and an electromagnetic sensor panel that detects a fine touch.

In an embodiment of the present disclosure, the display 160 includes a first screen 161 and a second screen 162 which separately display information based on at least one application. The second screen 162 has a different size from the first screen 161 and is displayed overlapped over the first screen 161.

With reference to FIGS. 2A to 18, operations of controlling screens in the above-described device will be described below.

Figure 2A:
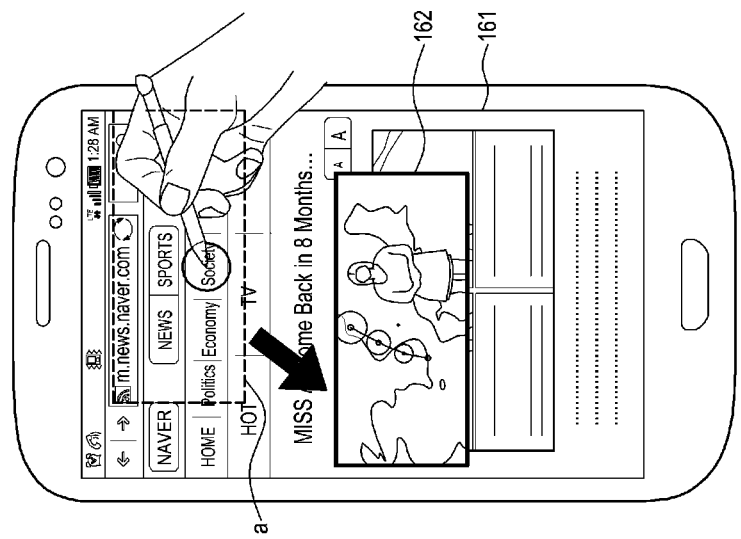
FIGS. 2A and 2B illustrate a movement of a second screen in a device according to an embodiment of the present disclosure.
Figure 2B:
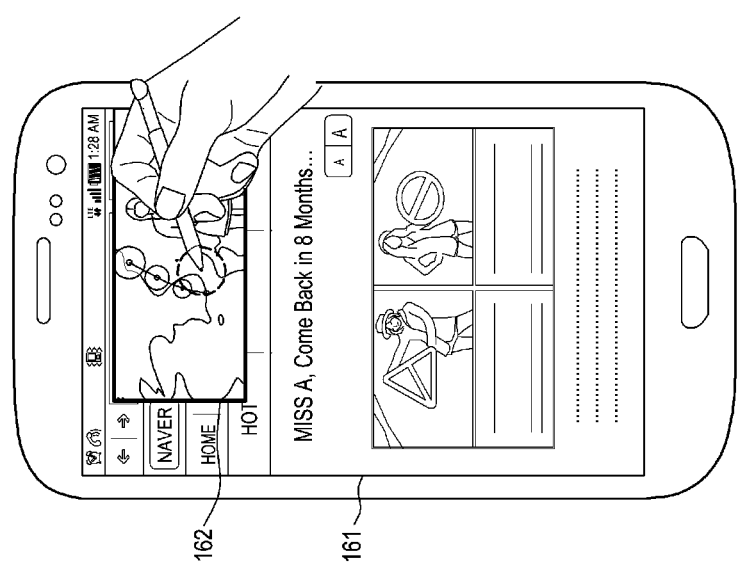

FIGS. 2A and 2B illustrate a movement of a second screen in a device according to an embodiment of the present disclosure.

Referring to FIGS. 2A and 2B, Internet application-based information is displayed on the first screen 161 of the display 160, while TV application-based information is displayed on the second screen 162 of the display 160. Upon generation of a hovering gesture of a touch pen above the second screen 162, the second screen 162 moves from a currently displayed area (a) to another area, as illustrated in FIG. 2B. Thus, partial information of the first screen 161 hidden by the second screen 162, that is, partial information of the first screen 161 hidden under the displayed area (a) of the second screen 162 is displayed to be viewable to a user.

Another area to which the second screen 162 has moved from the currently displayed area (a) upon generation of the hovering gesture is an area available to the second screen 162 other than the currently displayed area (a) on the first screen 161.

The operation illustrated in FIGS. 2A and 2B will be described with reference to FIGS. 3A and 3B.

Figure 3A:
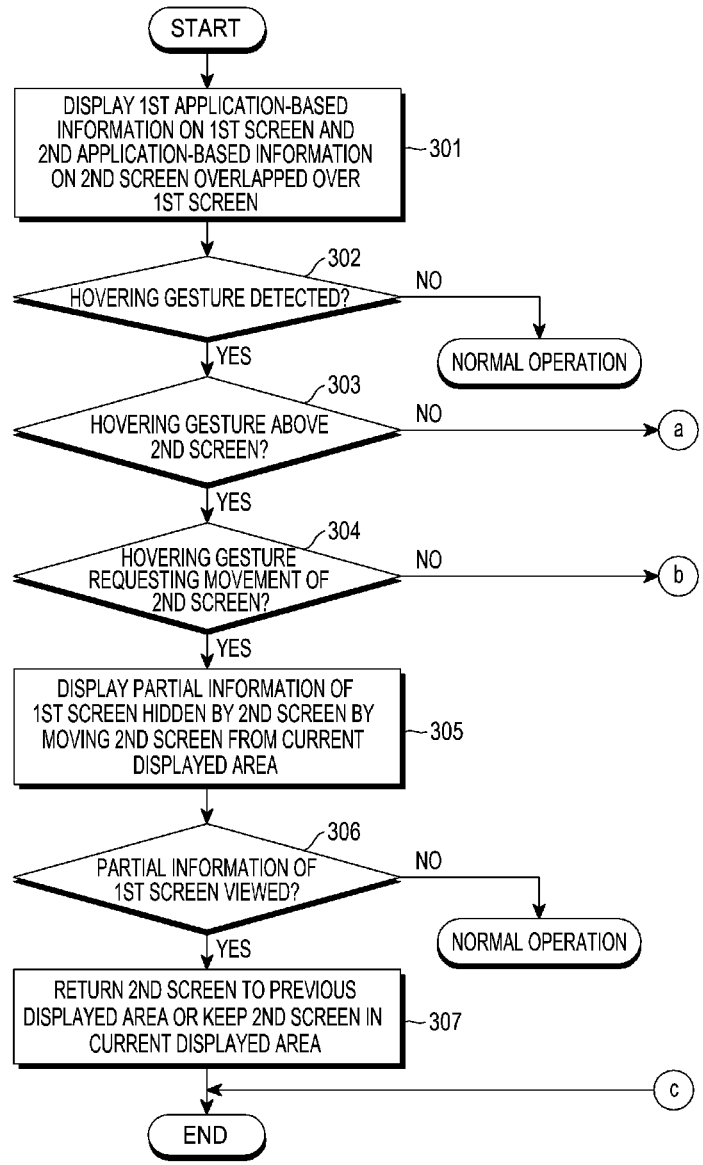
FIGS. 3A and 3B are flowcharts illustrating an operation of moving a second screen in a device according to an embodiment of the present disclosure.
Figure 3B:
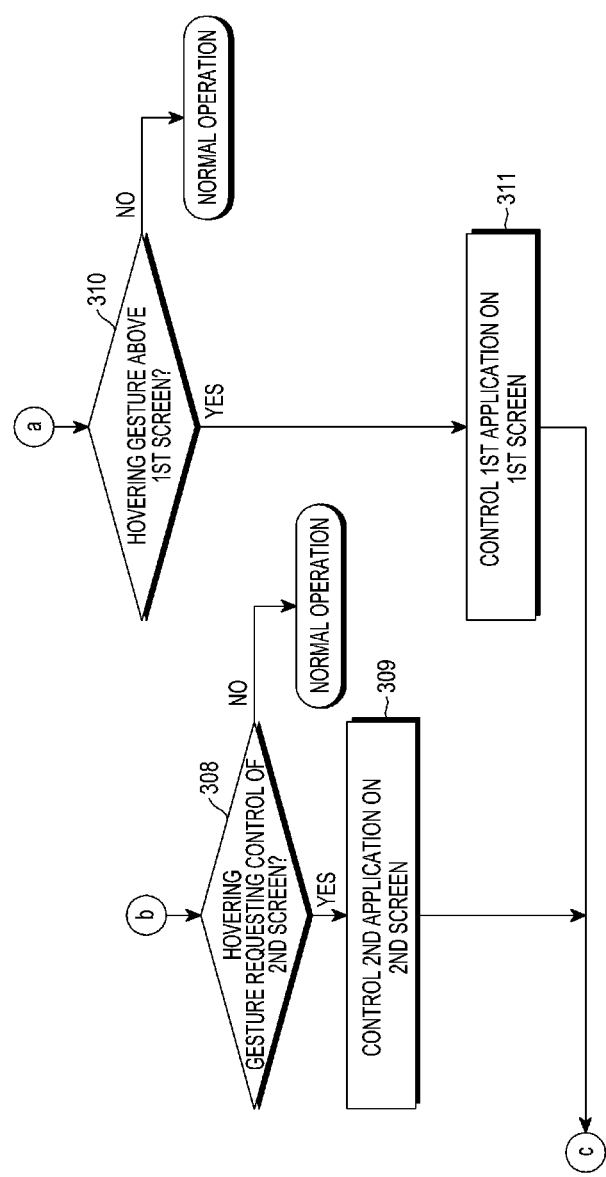

FIGS. 3A and 3B are flowcharts illustrating an operation of moving a second screen in a device according to an embodiment of the present disclosure.

The embodiment of the present disclosure illustrated in FIGS. 3A and 3B will be described below with reference to FIG. 1 and FIGS. 3A and 3B.

Referring to FIGS. 3A and 3B, information based on a first application is displayed on the first screen 161, while information based on a second application is displayed on the second screen 162 of a different size from the first screen 161, overlapped over the first screen 161 at operation 301. Upon detecting a hovering gesture at operation 302, the controller 110 determines the coordinates of the position of the hovering gesture. If the controller 110 determines that the hovering gesture has been generated above the second screen 162 based on the coordinates of the position of the hovering gesture at operation 303, the controller 110 determines the type of the hovering gesture.

If the hovering gesture has been generated by a touch pen, the type of the hovering gesture may be identified depending on whether a button of the touch pen has been pressed or not.

When the hovering gesture has been detected along with the input of the button of the touch pen, the controller 110 determines that the hovering gesture is a request for moving the second screen 162 at operation 304. At operation 305, the controller 110 moves the second screen 162 from a currently displayed area so that partial information of the first screen 161 hidden by the second screen may be displayed to be viewable.

When the controller 110 determines that the user has finished viewing the partial information of the first screen 161 from which the second screen 162 has been moved at operation 306, the controller 110 returns the second screen 162 to the previous displayed area or keeps the second screen 162 in a currently displayed area at operation 307.

On the other hand, when the hovering gesture has been generated without the input of the button of the touch pen, the controller 110 determines that the hovering gesture is a request for controlling the second screen 162 at operation 308 and controls the information based on the second application on the second screen 162 at operation 309.

Meanwhile, if the controller 110 determines that the hovering gesture has been generated above the first screen 161 based on the coordinates of the position of the hovering gesture at operation 310, the controller 110 controls the information based on the first application on the first screen 161 at operation 311.

Figure 4A:
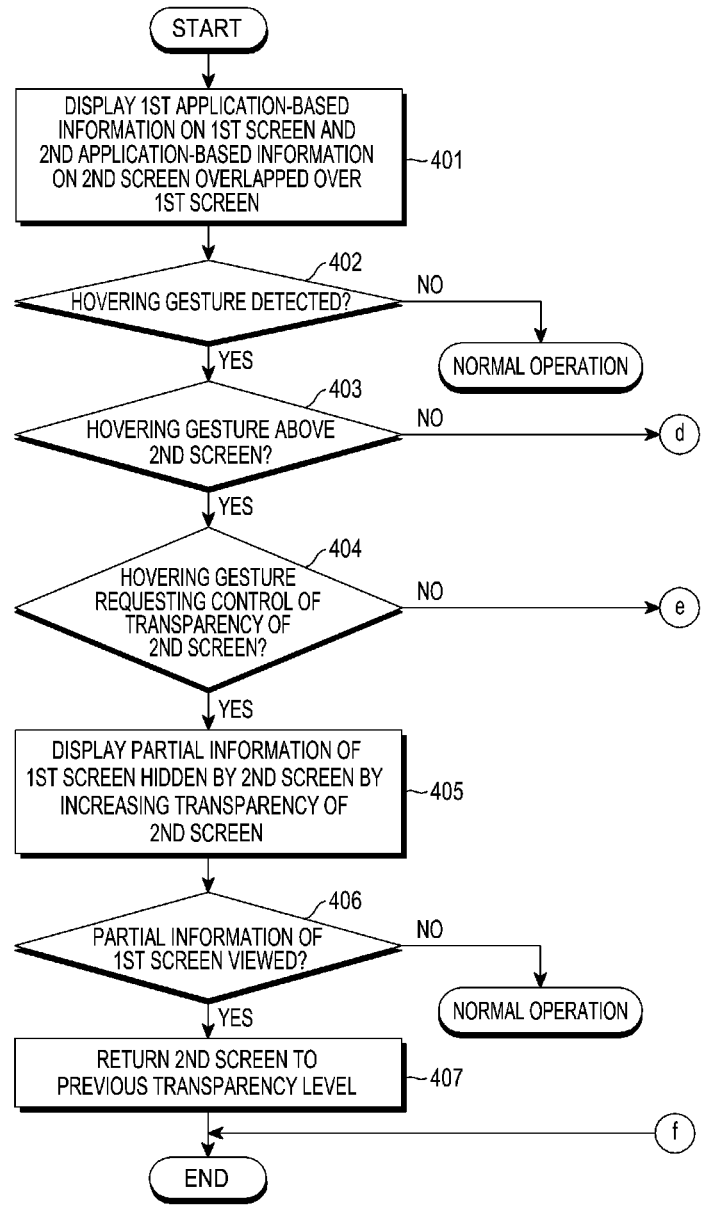
FIGS. 4A and 4B are flowcharts illustrating an operation of controlling a transparency of a second screen in a device according to an embodiment of the present disclosure.
Figure 4B:
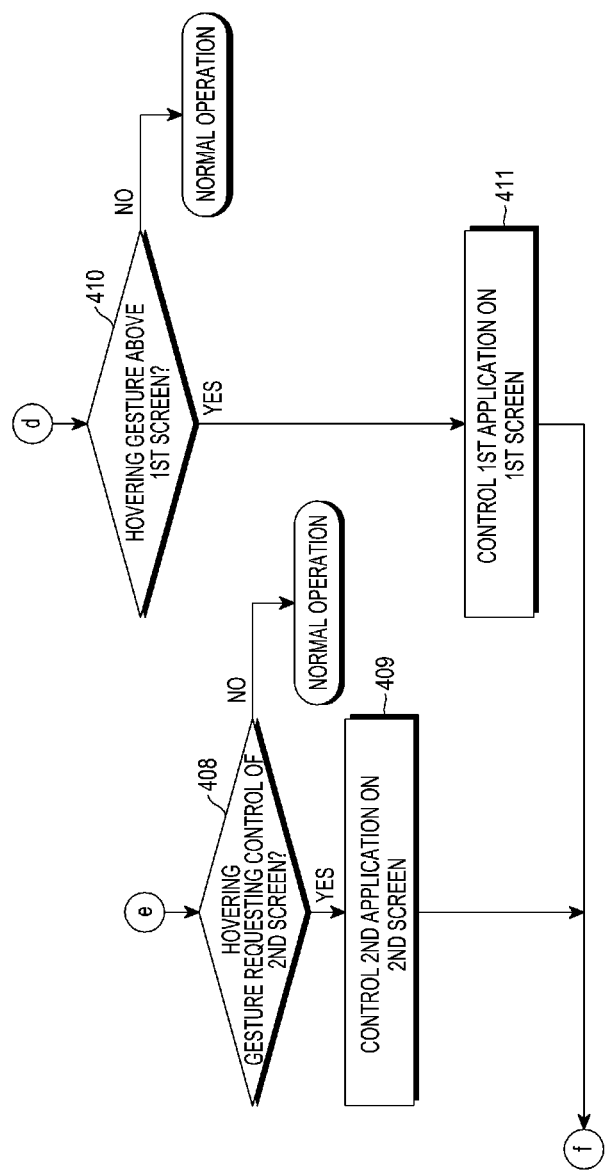

FIGS. 4A and 4B are flowcharts illustrating an operation of controlling a transparency of a second screen in a device according to an embodiment of the present disclosure.

The embodiment of the present disclosure illustrated in FIGS. 4A and 4B will be described below with reference to FIG. 1 and FIGS. 4A and 4B.

Referring to FIGS. 4A and 4B, information based on a first application is displayed on the first screen 161, while information based on a second application is displayed on the second screen 162 of a different size from the first screen 161, overlapped over the first screen 161 at operation 401. Upon detecting a hovering gesture at operation 402, the controller 110 determines the coordinates of the position of the hovering gesture. If the controller 110 determines that the hovering gesture has been generated above the second screen 162 based on the coordinates of the position of the hovering gesture at operation 403, the controller 110 determines the type of the hovering gesture.

If the hovering gesture has been generated by a touch pen, the type of the hovering gesture may be identified depending on whether a button of the touch pen has been pressed or not.

When the hovering gesture has been detected along with the input of the button of the touch pen, the controller 110 determines that the hovering gesture is a request for controlling the transparency of the second screen 162 at operation 404. At operation 405, the controller 110 increases the transparency of the second screen 162 so that partial information of the first screen 161 hidden by the second screen may show through the more transparent second screen 162.

More specifically, the controller 110 may increase the transparency of a partial area of the second screen 162 around the coordinates of the position of the hovering gesture or the transparency of the entire area of the second screen 162 at operation 405.

When the controller 110 determines that the user has finished viewing the partial information of the first screen 161 through the more transparent second screen 162 at operation 406, the controller 110 returns the second screen 162 to a previous transparency level at operation 407.

On the other hand, when the hovering gesture has been detected without the input of the button of the touch pen, the controller 110 determines that the hovering gesture is a request for controlling the second screen 162 at operation 408 and controls the information based on the second application on the second screen 162 at operation 409.

If the controller 110 determines that the hovering gesture has been generated above the first screen 161 based on the coordinates of the position of the hovering gesture at operation 410, the controller 110 controls the information based on the first application on the first screen 161 at operation 411.

While it has been described according to the above embodiment of the present disclosure that a second screen is moved or the transparency of the second screen is controlled according to a hovering gesture above the second screen, it may be further contemplated that the size of the second screen is decreased to a certain size according to the hovering gesture above the second screen and when it is determined that a user has finished viewing partial information of a first screen hidden by the second screen, the second screen is returned to its original size.

Figure 5B:
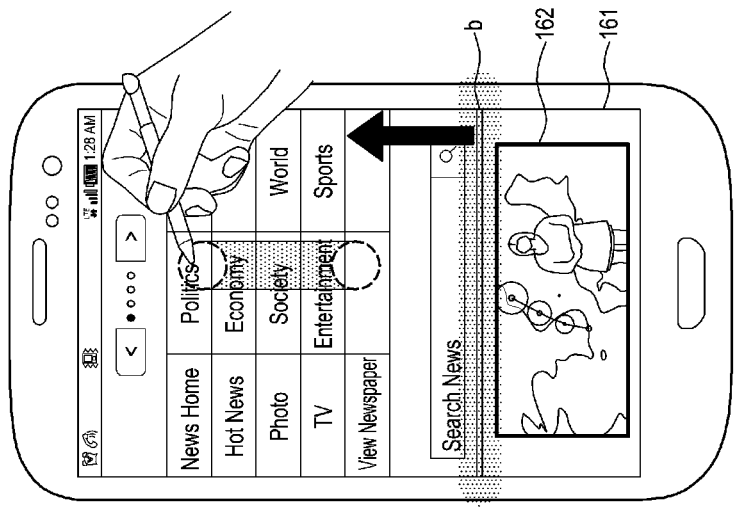
FIGS. 5A and 5B illustrate control of a second screen by scrolling up or down a first screen in a device according to an embodiment of the present disclosure.
Figure 5A:
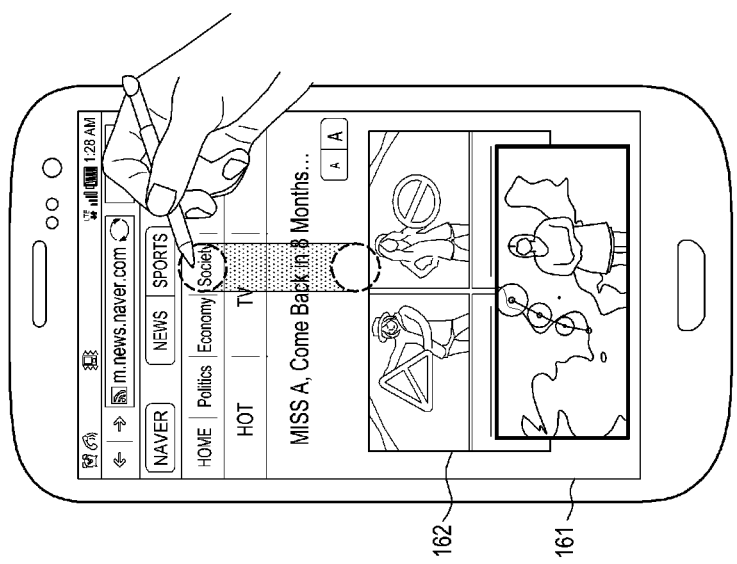

FIGS. 5A and 5B illustrate control of a second screen by scrolling up or down a first screen in a device according to an embodiment of the present disclosure.

Referring to FIGS. 5A and 5B, Internet application-based information is displayed on the first screen 161 of the display 160, while TV application-based information is displayed on the second screen 162 overlapped over a lower area of the first screen 161. If the first screen 161 is scrolled up until lowermost Internet application-based information is scrolled up on the first screen 161, a bottom boundary of the first screen 161 is moved up to or above a top boundary (b) of the second screen 162 in the lower area of the first screen 161 by further scroll-up of the first screen 161 as illustrated in FIG. 5B. Therefore, information in the lower area of the first screen 161 is displayed without overlapping with the second screen 162.

Figure 6:
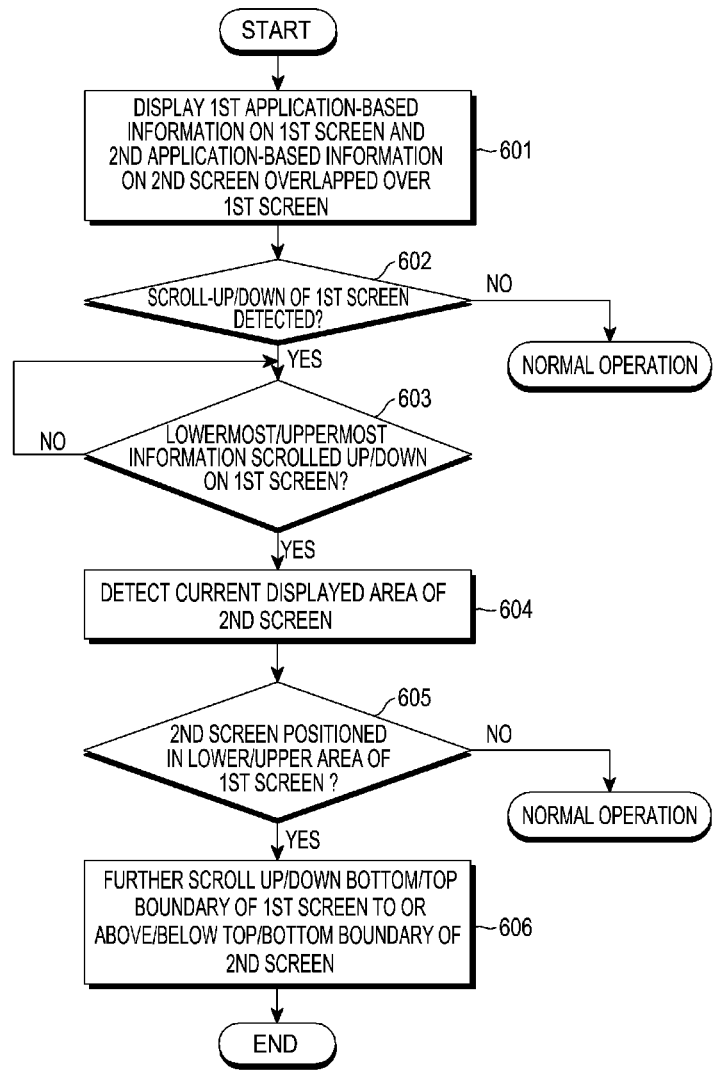
FIG. 6 is a flowchart illustrating an operation of controlling a second screen by scrolling up or down a first screen in a device according to a second embodiment of the present disclosure.

FIG. 6 is a flowchart illustrating an operation of controlling a second screen by scrolling up or down a first screen in a device according to a second embodiment of the present disclosure.

The embodiment of the present disclosure illustrated in FIG. 6 will be described with reference to FIGS. 1 and 6.

Referring to FIG. 6, information based on a first application is displayed on the first screen 161, while information based on the second application is displayed on the second screen 162 of a different size from the first screen 161, overlapped over the first screen 161 at operation 601. Upon detecting a scroll-up/down of the first screen 161 at operation 602, the controller 110 scrolls up/down information on the first screen 161.

When lowermost/uppermost information based on the first application is scrolled up/down on the first screen 161 during displaying the scrolled-up/down information on the first screen 161 at operation 603, the controller 110 detects a currently displayed area of the second screen 162 at operation 604.

If it is determined that the second screen 162 is in a lower/upper area of the first screen 161 at operation 605, the controller 110 moves the bottom/top boundary of the first screen 161 to or above/below the top/bottom boundary of the second screen 162 by further scrolling up/down the first screen 161 so that information in the lower/upper area of the first screen 161 may not be overlapped with the second screen 162 at operation 606.

Figure 7B:
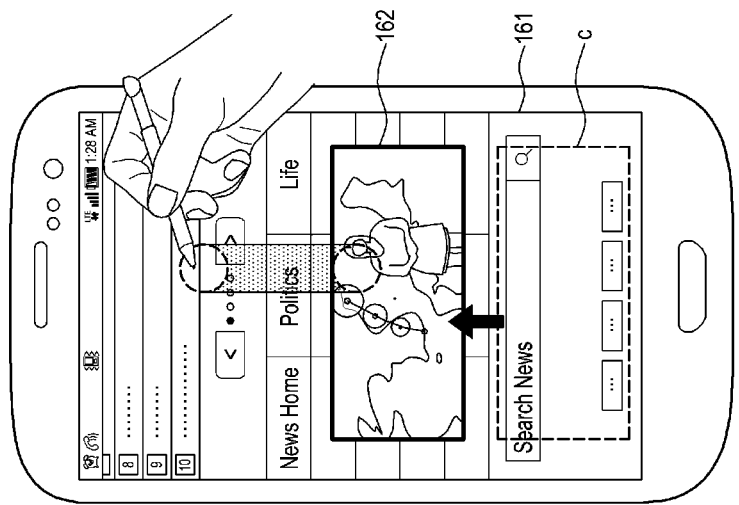
FIGS. 7A and 7B illustrate a movement of a second screen by scrolling up or down a first screen according to the second embodiment of the present disclosure.
Figure 7A:
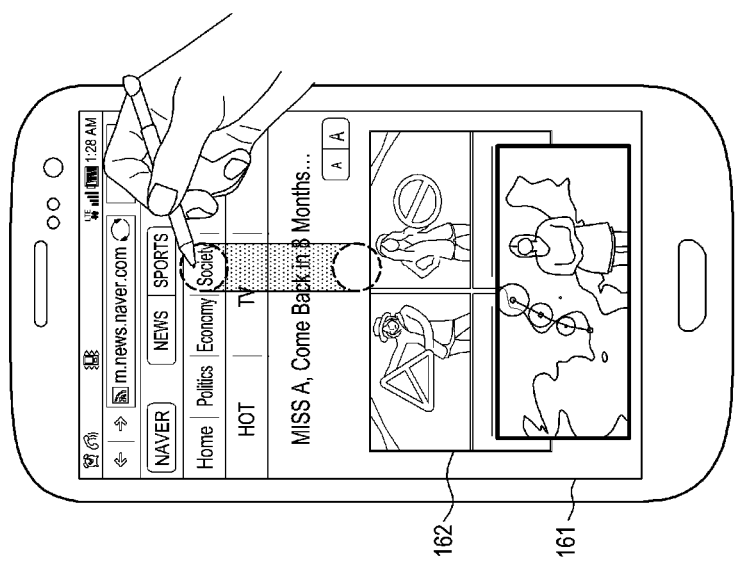

FIGS. 7A and 7B illustrate a movement of a second screen by scrolling up or down a first screen according to the second embodiment of the present disclosure.

Referring to FIGS. 7A and 7B, Internet application-based information is displayed on the first screen 161 of the display 160, while TV application-based information is displayed on the second screen 162 overlapped over a lower area of the first screen 161. If the first screen 161 is scrolled up until lowermost Internet-based information is scrolled up on the first screen 161, the second screen 162 is moved out of a currently displayed area (c) in the lower area of the first screen 161 as illustrated in FIG. 7B. Therefore, information hidden by the second screen 162 in the lower area of the first screen 161, that is, information of the first screen 161 hidden under the displayed area (c) of the second screen 162 is displayed to be viewable.

Figure 8:
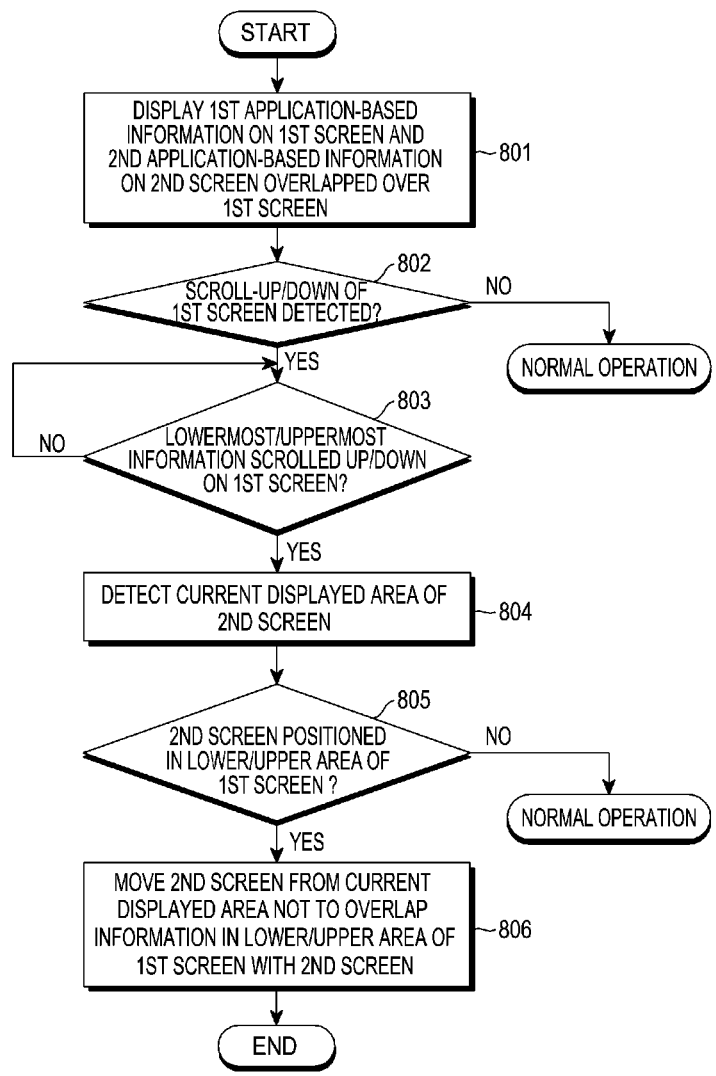
FIG. 8 is a flowchart illustrating an operation of moving a second screen by scrolling up or down a first screen in a device according to the second embodiment of the present disclosure.

FIG. 8 is a flowchart illustrating an operation of moving a second screen by scrolling up or down a first screen in a device according to the second embodiment of the present disclosure.

The embodiment of the present disclosure illustrated in FIG. 8 will be described with reference to FIGS. 1 and 8.

Referring to FIG. 8, information based on a first application is displayed on the first screen 161, while information based on the second application is displayed on the second screen 162 of a different size from the first screen 161, overlapped over the first screen 161 at operation 801. Upon detecting a scroll-up/down of the first screen 161 at operation 802, the controller 110 scrolls up/down information on the first screen 161.

When lowermost/uppermost information based on the first application is scrolled up on the first screen 161 during displaying the scrolled-up/down information on the first screen 161 at operation 803, the controller 110 detects a currently displayed area of the second screen 162 at operation 804.

If it is determined that the second screen 162 is in a lower/upper area of the first screen 161 at operation 805, the controller 110 moves the second screen 162 out of the currently displayed area so that information in the lower/upper area of the first screen 161 may not be overlapped with the second screen 162 at operation 806.

Figure 9:
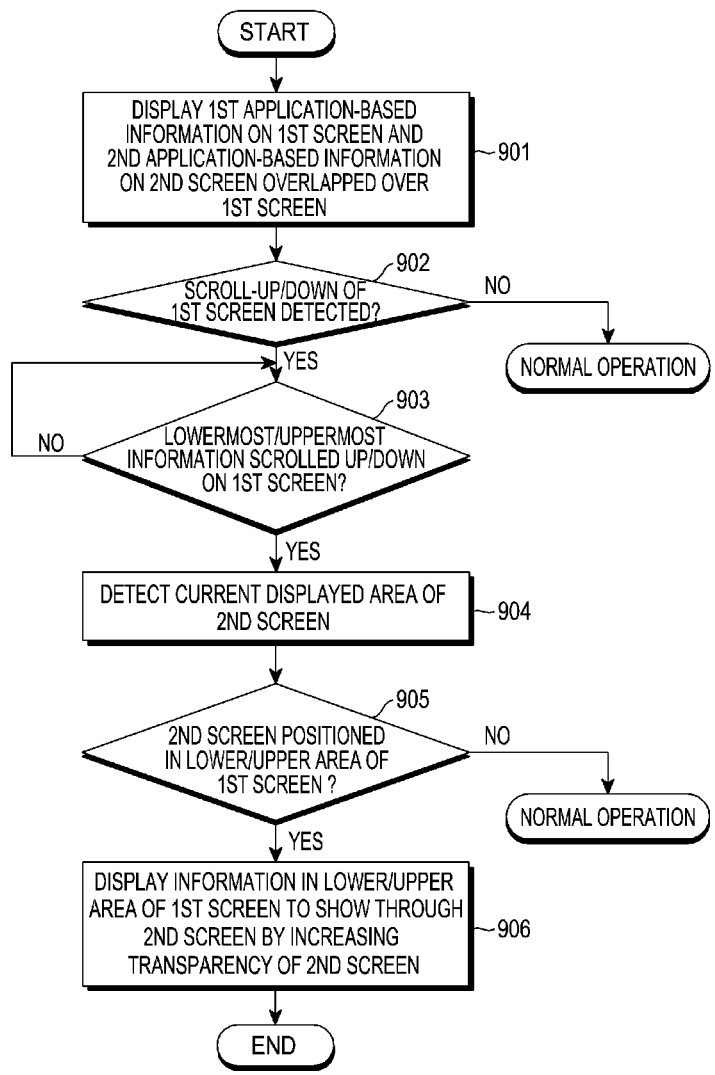
FIG. 9 is a flowchart illustrating an operation of controlling a transparency of a second screen by scrolling up or down a first screen in a device according to the second embodiment of the present disclosure.
Figure 10:
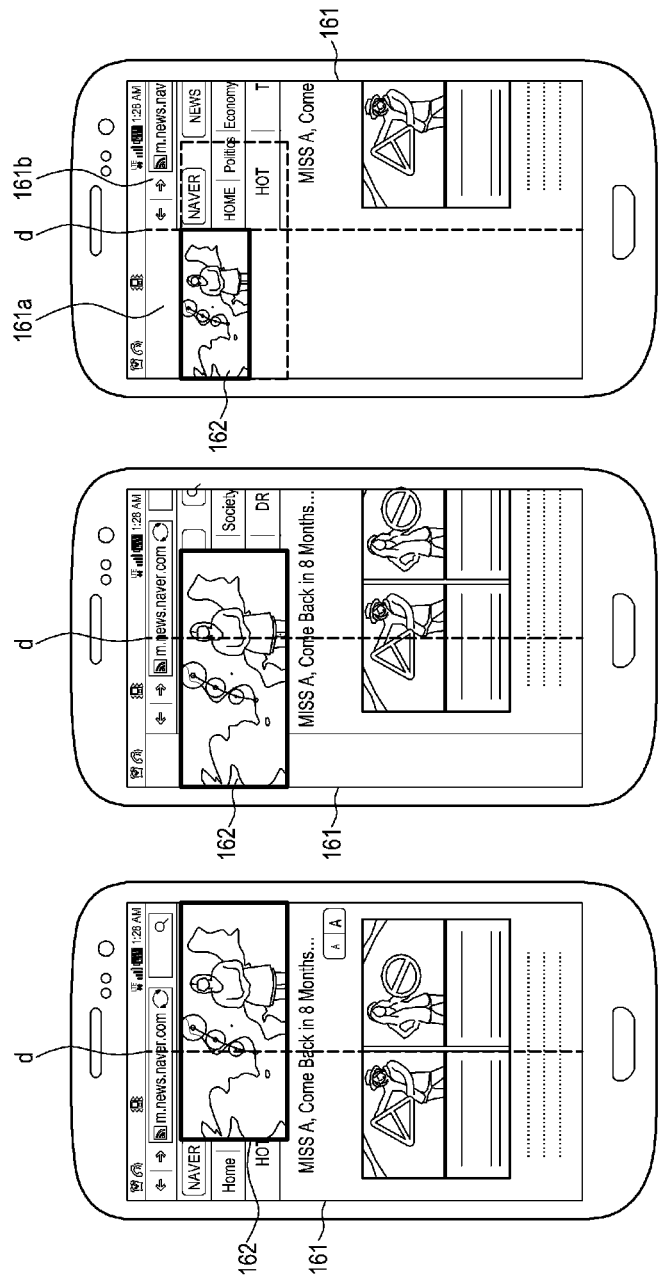
FIGS. 10A, 10B, and 10C illustrate control of a movement and a size of a second screen by scrolling a first screen to the left or to the right in a device according to the second embodiment of the present disclosure.

FIG. 9 is a flowchart illustrating an operation of controlling a transparency of a second screen by scrolling up or down a first screen in a device according to the second embodiment of the present disclosure.

The embodiment of the present disclosure illustrated in FIG. 9 will be described with reference to FIGS. 1 and 9.

Referring to FIG. 9, information based on a first application is displayed on the first screen 161, while information based on the second application is displayed on the second screen 162 of a different size from the first screen 161, overlapped over the first screen 161 at operation 901. Upon detecting a scroll-up/down of the first screen 161 at operation 902, the controller 110 scrolls up/down information on the first screen 161.

When lowermost/uppermost information based on the first application is scrolled up on the first screen 161 during displaying the scrolled-up/down information on the first screen 161 at operation 903, the controller 110 detects a currently displayed area of the second screen 162 at operation 904.

If it is determined that the second screen 162 is in a lower/upper area of the first screen 161 at operation 905, the controller 110 increases the transparency of the second screen 162 so that information in the lower/upper area of the first screen 161 may show through the more transparent second screen 162 at operation 906.

If it is determined that the user finishes viewing the information in the lower/upper area of the first screen 161, the controller 110 returns the second screen 162 to a previous transparency level.

FIGS. 10A, 10B, and 10C illustrate control of a movement and a size of a second screen by scrolling a first screen to the left or to the right in a device according to the second embodiment of the present disclosure.

Referring to FIGS. 10A, 10B, and 10C, Internet application-based information is displayed on the first screen 161 of the display 160, while TV application-based information is displayed on the second screen 162 overlapped over an upper area of the first screen 161. If the first screen 161 is scrolled to the right, a virtual reference line (d) is drawn vertically on the first screen 161. The reference line (d) may be a vertical center line of the first screen 161. As illustrated in FIGS. 10B and 10C, when leftmost information based on the Internet application moves to a right area 161b defined on the right side of the reference line (d) of the first screen 161 by the rightward scroll of the first screen 161, the second screen 162 positioned across the reference line (d) moves to a left area 161a defined on the left side of the reference line (d). If the second screen 162 is wider than the left area 161a, the size of the second screen 162 is scaled down so that the second screen 162 may be displayed within the second area 162a.

The moment the leftmost Internet application-based information reaches the right area 161b of the first screen 161, the second screen 162 may be moved to the left area 161a. Alternatively, while the leftmost Internet application-based information is moving to the right area 161b of the first screen 161, the second screen 162 may be moved progressively to the left area 162a, while the size of the second screen 162 is being adjusted gradually.

The operation of FIGS. 10A, 10B, and 10C will be described with reference to FIG. 11

Figure 11:
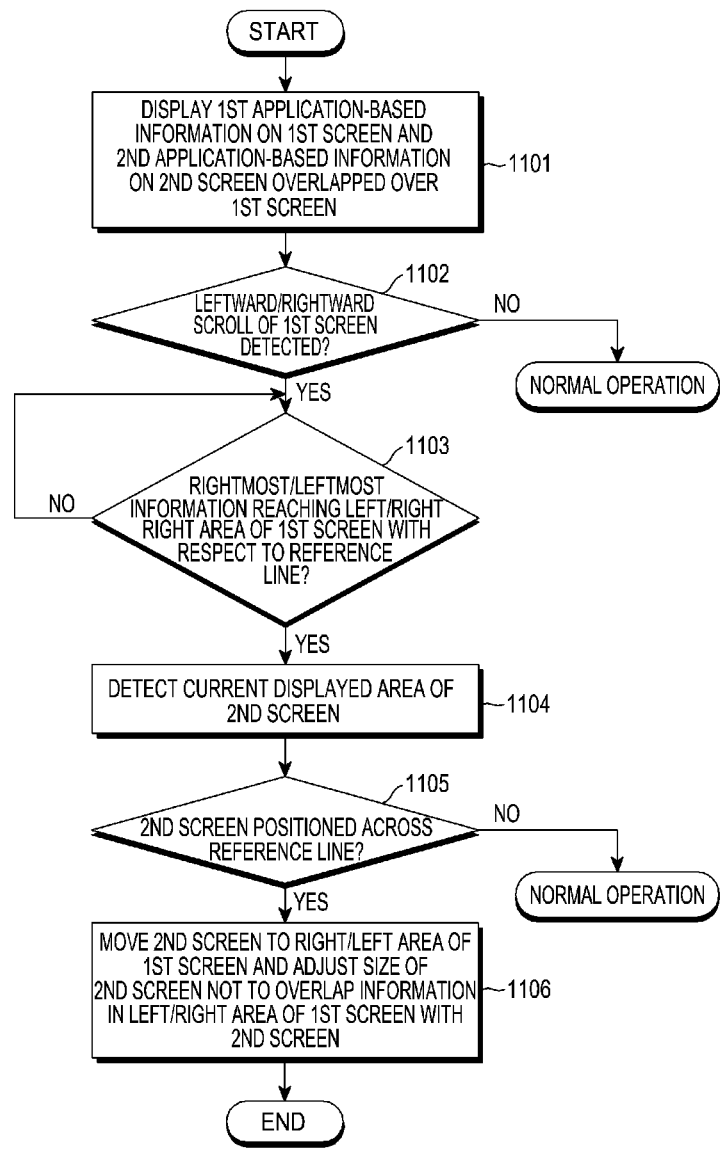
FIG. 11 is a flowchart illustrating an operation of controlling a movement and a size of a second screen by scrolling a first screen to the left or to the right in a device according to the second embodiment of the present disclosure.

FIG. 11 is a flowchart illustrating an operation of controlling a movement and a size of a second screen by scrolling a first screen to the left or to the right in a device according to the second embodiment of the present disclosure.

The embodiment of the present disclosure illustrated in FIG. 11 will be described below with reference to FIGS. 1 and 11.

Referring to FIG. 11, information based on a first application is displayed on the first screen 161, while information based on a second application is displayed on the second screen 162 of a different size from the first screen, overlapped over the first screen 161 at operation 1101. Upon detecting a leftward/rightward scroll of the first screen 161 at operation 1102, the controller 110 scrolls information to the left/right on the first screen 161.

When rightmost/leftmost information based on the first application reaches a left/right area defined on the left/right side of a reference line set on the first screen 161 during displaying the scrolled information at operation 1103, the controller 110 detects a currently displayed area of the second screen 162 at operation 1104.

If the currently displayed area of the second screen 162 is positioned across the reference line of the first screen 161 at operation 1105, the controller 110 moves the second screen 162 to the right/left area of the first screen 161 opposite to the left/right area of the first screen 161 into which the rightmost/leftmost information based on the first application has been moved and adjusts the size of the second screen 162 according to the size of the right/left area of the first screen 161, so that the information in the left/right area of the first screen 161 is not overlapped with the second screen 162 at operation 1106.

More specifically, when the rightmost information based on the first application reaches the left area of the first screen 161 defined with reference to the reference line by a leftward scroll of the first screen 161, the controller 110 displays the second screen 162 in the right area of the first screen 161, with an adjusted size. When the leftmost information based on the first application reaches the right area of the first screen 161 defined with reference to the reference line by a rightward scroll of the first screen 161, the controller 110 displays the second screen 162 in the left area of the first screen 161, with an adjusted size.

While it has been described in the second embodiment of the present disclosure illustrated in FIGS. 10A, 10B, and 11 that a second screen is moved and the size of the second screen is adjusted according to a leftward/rightward scroll of a first screen, it may be further contemplated that information of the first screen hidden by the second screen shows through the second screen by controlling the transparency of the second screen according to a leftward/rightward scroll of the first screen.

In addition, while the second screen is controlled according to a leftward/rightward scroll of the first screen in FIGS. 10A, 10B, and 11, the additional scroll of the first screen or the control of movement or transparency of the second screen according to a scroll-up/down of the first screen illustrated in FIGS. 5A to 9 is also applicable to the operation illustrated in FIGS. 10A, 10B, and 11.

Figure 12B:
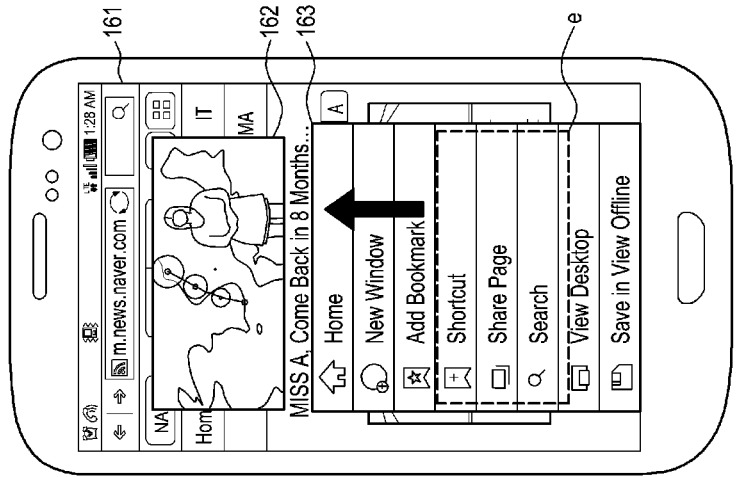
FIGS. 12A and 12B illustrate a movement of a second screen in response to a display of a pop-up window on a first screen in a device according to a third embodiment of the present disclosure.
Figure 12A:
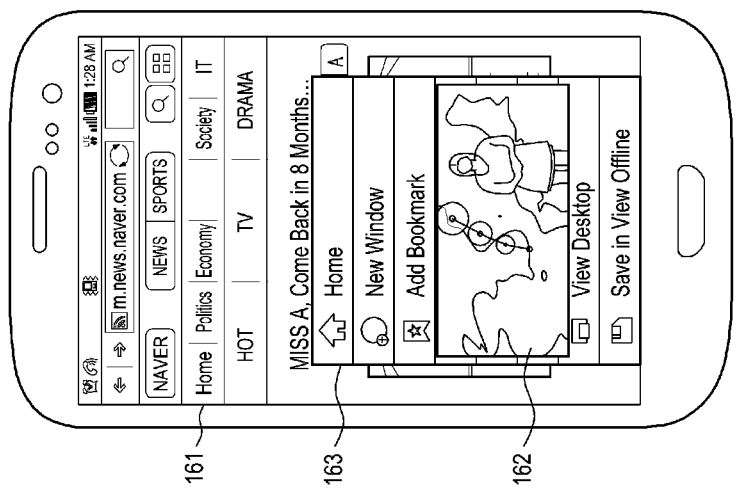

FIGS. 12A and 12B illustrate a movement of a second screen in response to a display of a pop-up window on a first screen in a device according to a third embodiment of the present disclosure.

Referring to FIGS. 12A and 12B, Internet application-based information is displayed on the first screen 161 of the display 160, while TV application-based information is displayed on the second screen 162 overlapped over a lower area of the first screen 161. When a menu pop-up window 163 including menu types is displayed to execute a function according to an input of a specific button, the second screen 162 is moved out of a displayed area of the pop-up window 613 as illustrated in FIG. 12B. Therefore, partial information hidden by the second window 162 in the menu pop-up window 163 of the first screen 161, that is, partial information of the menu pop-up window 163 located in a displayed area (e) of the second screen 162 is displayed to be viewable on the first screen 161.

The operation illustrated in FIGS. 12A and 12B will be described with reference to FIG. 13.

Figure 13:
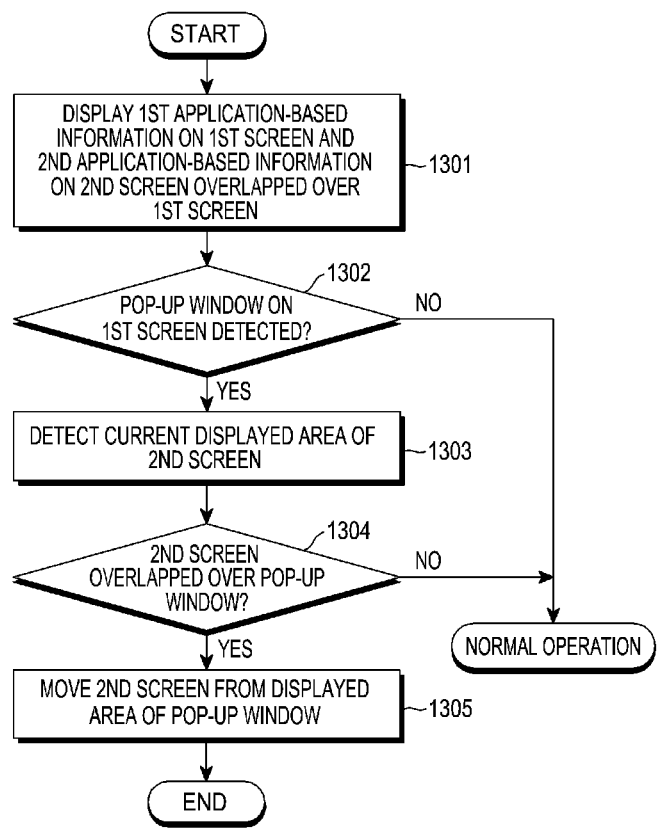
FIG. 13 is a flowchart illustrating an operation of moving a second screen in response to a display of a pop-up window on a first screen in a device according to the third embodiment of the present disclosure.

FIG. 13 is a flowchart illustrating an operation of moving a second screen in response to a display of a pop-up window on a first screen in a device according to the third embodiment of the present disclosure.

The embodiment of the present disclosure illustrated in FIG. 13 will be described below with reference to FIGS. 1 and 13.

Referring to FIG. 13, information based on a first application is displayed on the first screen 161, while information based on a second application is displayed on the second screen of a different size from the first screen 161, overlapped over the first screen 161 at operation 1301. Upon detecting display of a pop-up window on the first screen 161 at operation 1302, the controller 110 detects a currently displayed area of the second screen 162 at operation 1303.

If it is determined that the second screen 162 is overlapped with the pop-up window at operation 1304, the controller 110 moves the second screen 162 out of a displayed area of the pop-up window so that the pop-up window may not be overlapped with the second screen 162 at operation 1305. Even though the second screen 162 is moved out of the displayed area of the pop-up window, if the second screen 162 is so large as to be overlapped with the pop-up window, the controller 110 may additionally adjust the size of the second screen 162 during the movement of the second screen 162.

Figure 14:
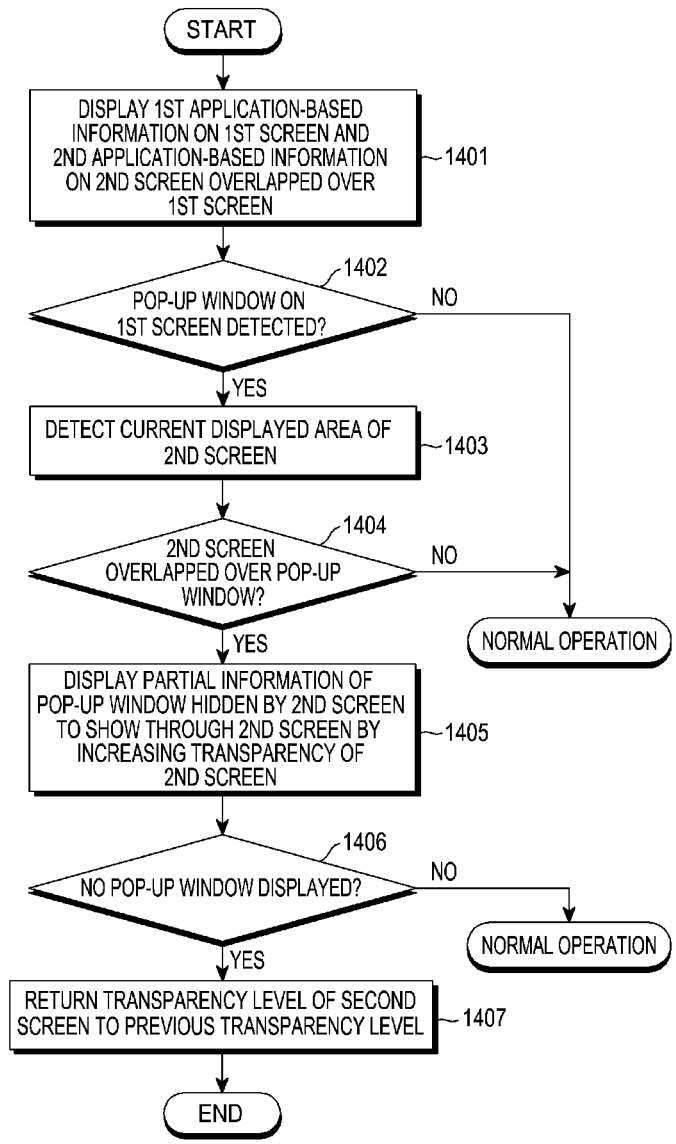
FIG. 14 is a flowchart illustrating an operation of controlling transparency of a second screen in response to a display of a pop-up window on a first screen in a device according to the third embodiment of the present disclosure.

FIG. 14 is a flowchart illustrating an operation of controlling transparency of a second screen in response to a display of a pop-up window on a first screen in a device according to the third embodiment of the present disclosure.

The embodiment of the present disclosure illustrated in FIG. 14 will be described below with reference to FIGS. 1 and 14.

Referring to FIG. 14, information based on a first application is displayed on the first screen 161, while information based on a second application is displayed on the second screen of a different size from the first screen 161, overlapped over the first screen 161 at operation 1401. Upon detecting display of a pop-up window on the first screen 161 at operation 1402, the controller 110 detects a currently displayed area of the second screen 162 at operation 1403.

If it is determined that the second screen 162 is overlapped with the pop-up window at operation 1404, the controller 110 increases the transparency of the second screen 162 so that partial information of the pop-up window hidden by the second screen 162 may show through the more transparent second screen 162 at operation 1405.

While the partial information of the pop-up window shows through the more transparent second screen 162, the second screen 162 is deactivated. Therefore, upon detecting a touch on the more transparent second screen 162, the controller 110 controls execution of a function of the pop-up window corresponding to the coordinates of the touched position on the first screen 161.

Upon detecting display of no pop-up window with the second screen 162 rendered more transparent at operation 1406, the controller 110 returns the second screen 162 to a previous transparency level at operation 1407.

Figure 15B:
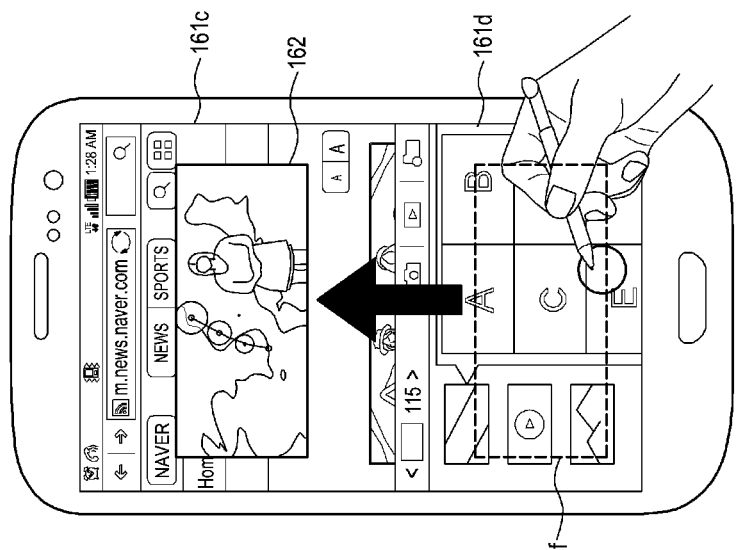
FIGS. 15A and 15B illustrate a movement of a second screen depending on activation of two applications, while information based on the two applications is being respectively displayed in two areas of a first screen in a device according to a fourth embodiment of the present disclosure.
Figure 15A:
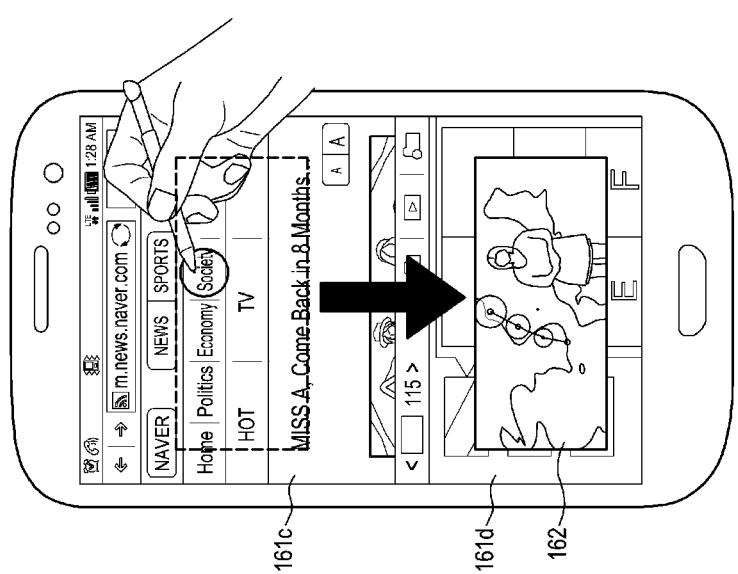

FIGS. 15A and 15B illustrate a movement of a second screen depending on activation of two applications, while information based on the two applications is respectively displayed in two areas of a first screen in a device according to a fourth embodiment of the present disclosure.

Referring to FIGS. 15A and 15B, the first screen 161 of the display 160 is divided into a first area 161c and a second area 161d. Internet application-based information and TV application-based information are displayed respectively in the first and second areas 161c and 161d of the first screen 161, while photo application-based information is displayed on the second screen 162. If the first area 161c of the first screen 161 is touched and thus, the Internet application is activated in the first area 161c, the second screen 162 is moved to the second area 161d in which the TV application is deactivated as illustrated in FIG. 15A. With the second screen 162 displayed overlapped over the second area 161d of the first screen 161, upon generation of a touch on the second area 161d, the second area 161d is activated. Thereafter, the second screen 162 is moved to the first area 161c in which the Internet application is deactivated, as illustrated in FIG. 15B, wherein a display area (f) illustrates where the moved second screen 162 was displayed.

The operation illustrated in FIGS. 15A and 15B will be described with reference to FIGS. 16A and 16B.

Figure 16A:
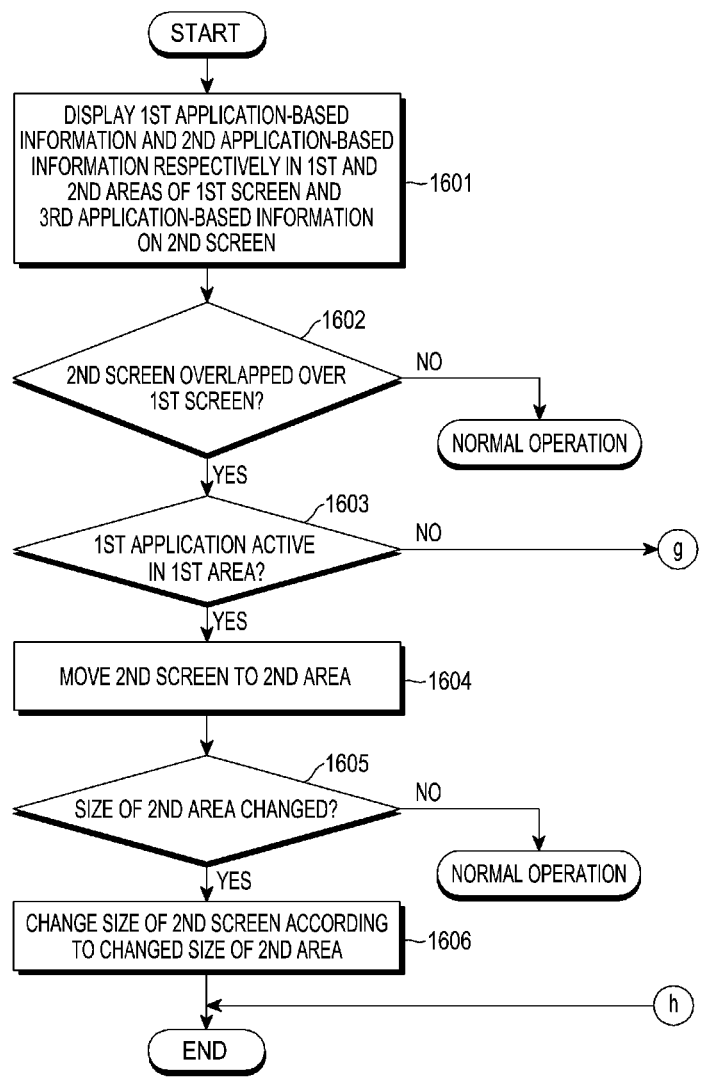
FIGS. 16A and 16B are flowcharts illustrating an operation of moving a second screen according to an input gesture on a first screen in a device according to the fourth embodiment of the present disclosure.
Figure 16B:
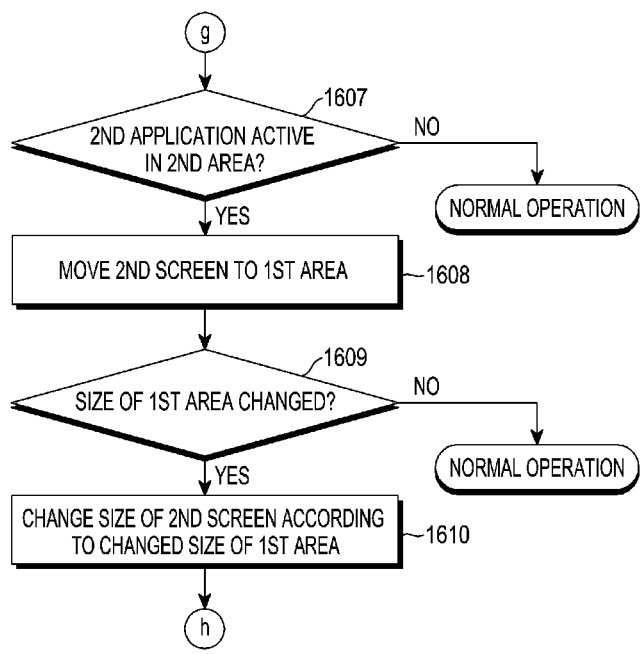

FIGS. 16A and 16B are flowcharts illustrating an operation of moving a second screen according to an input gesture on a first screen in a device according to the fourth embodiment of the present disclosure.

The operation illustrated in FIGS. 16A and 16B will be described below with reference to FIGS. 1, 16A, and 16B.

Referring to FIGS. 16A and 16B, information based on a first application is displayed in a first area of the first screen 161, while information based on a second application is displayed in a second area of the first screen 161 at operation 1601. Upon detecting the presence of the second screen 1602 overlapped over the first screen 171, which displays information based on a third application at operation 1602, the controller 110 determines which application between the first and second applications is active.

Upon detecting a gesture, such as a touch in the first area of the first screen, the controller 110 determines that the first application is active in the first area at operation 1603 and determines a currently displayed area of the second screen 162. If the second screen 162 is displayed in the first area of the first screen 161, the controller 110 moves the second screen 162 to the second area in which the second application is inactive at operation 1604.

Upon detecting a change in the size of the second area of the first screen 161 with the second screen 162 displayed in the second area at operation 1605, the controller 110 adjusts the size of the second screen 162 according to the changed size of the second area at operation 1606.

Upon detecting a gesture, such as a touch on the second area of the first screen 161, the controller 110 determines that the second application is active in the second area at operation 1607 and detects a currently displayed area of the second screen 162. If the second screen 162 is displayed in the second area of the first screen 161, the controller 110 moves the second screen 162 to the first area in which the first application is inactive at operation 1608.

Upon detecting a change in the size of the first area of the first screen 161 with the second screen 162 displayed in the first area at operation 1609, the controller 110 adjusts the size of the second screen 162 according to the changed size of the first area at operation 1610.

Figure 17B:
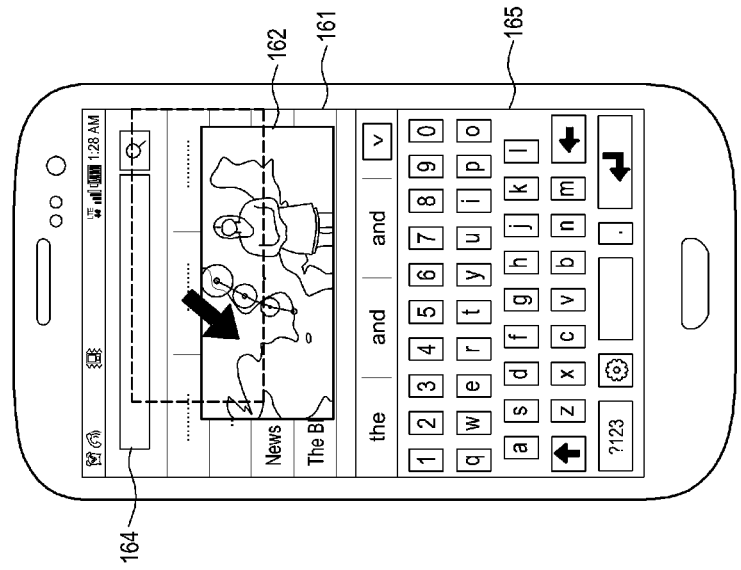
FIGS. 17A and 17B illustrate a movement of a second screen according to an input gesture on a first screen in a device according to a fifth embodiment of the present disclosure.
Figure 17A:
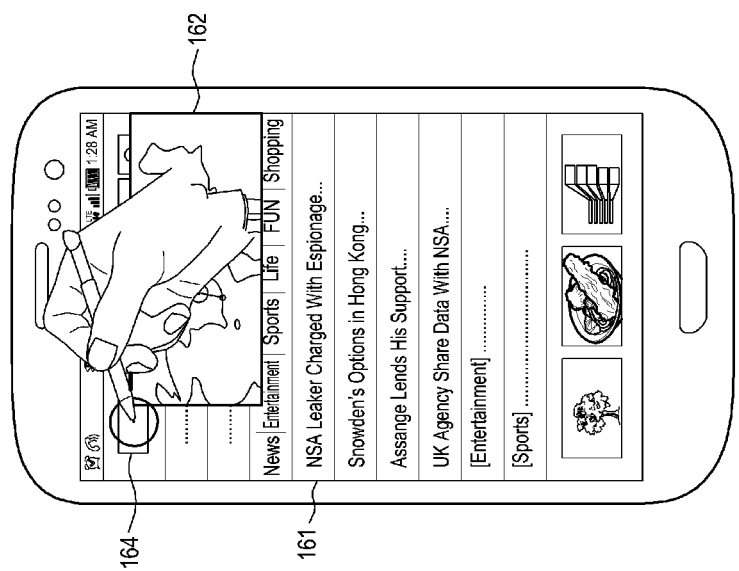

FIGS. 17A and 17B illustrate a movement of a second screen according to an input gesture on a first screen in a device according to a fifth embodiment of the present disclosure.

Referring to FIGS. 17A and 17B, Internet application-based information is displayed on the first screen 161 of the display 160, while TV application-based information is displayed on the second screen 162 overlapped over an input window 164 of the first screen 161. Upon generation of an input gesture, such as a touch on the input window 164, the second screen 162 may be moved or the size of the second screen 162 may be adjusted so that the second screen 162 may not be overlapped with the input window 164 or a keypad 165 triggered by the input gesture on the input window 164, as illustrated in FIG. 17B.

The operation illustrated in FIGS. 17A and 17B will be described with reference to FIG. 18.

Figure 18:
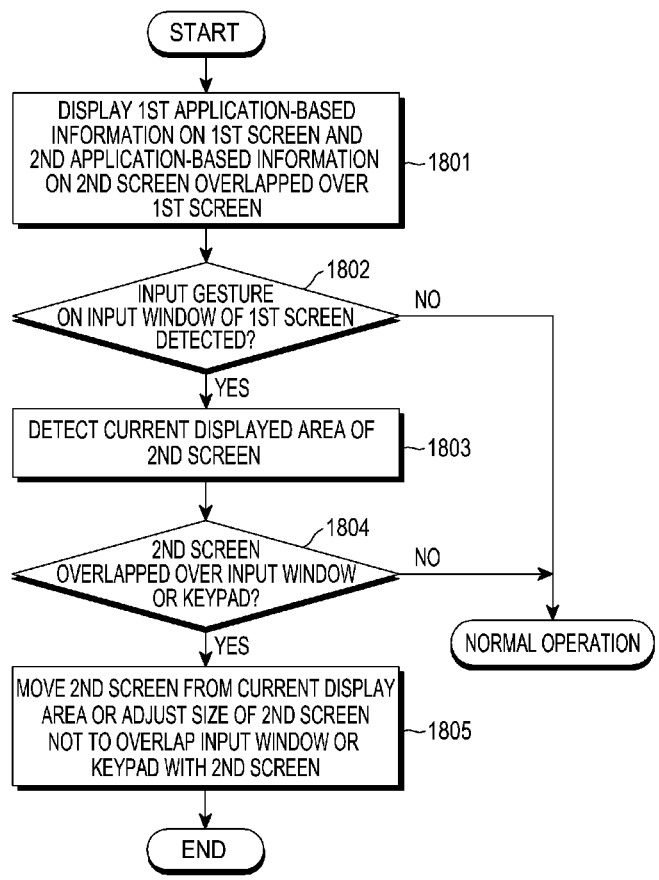
FIG. 18 is a flowchart illustrating an operation of moving a second screen according to an input gesture on a first screen in a device according to the fifth embodiment of the present disclosure.

FIG. 18 is a flowchart illustrating an operation of moving a second screen according to an input gesture on a first screen in a device according to the fifth embodiment of the present disclosure.

The operation of FIG. 18 will be described below with reference to FIGS. 1 and 18.

Referring to FIG. 18, information based on a first application is displayed on the first screen 161, while information based on a second application is displayed on the second screen 162 of a different size from the first screen 161, overlapped over the first screen 161 at operation 1801. Upon detecting an input gesture, such as a touch on an input window of the first screen 161 at operation 1802, the controller 110 detects a currently displayed area of the second screen 162 at operation 1803. If it is determined that the second screen 162 is overlapped with the input window or a keypad triggered by the input gesture on the input window on the first screen 161 at operation 1804, the controller 110 moves the second screen 162 or controls the size of the second screen 162 so that the second screen 162 may not be overlapped with the input window or the keypad at operation 1805.

As is apparent from the above description of the method and apparatus for controlling screens in a device according to various embodiments of the present disclosure, while information based on at least one application is being displayed separately on a plurality of screens, information of a specific screen hidden by another screen is displayed to be viewable on the specific screen without a user manipulation of the underlying screen by automatically controlling the position, size, and transparency of the overlying screen.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more processor readable mediums. Examples of the processor readable mediums include a Read-Only Memory (ROM), a Random-Access Memory (RAM), Compact Disc (CD)-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for controlling screens in a device, the apparatus comprising:
 a display configured to include a first screen and a second screen overlapped over the first screen; and
 at least one processor configured to:
  change an attribute of the second screen, upon detecting a gesture corresponding to performing a function related to the first screen while information is being displayed separately on the first and second screens, the gesture being at least a user eye-movement directed toward the second screen,
  display the second screen that is changed by the changed attribute, and
  display partial information of the first screen hidden by the second screen overlapped over the first screen while the user eye-movement remains directed toward the second screen.

2. The apparatus of claim 1, wherein the attribute of the second screen includes at least one of a position, a size, or a transparency of the second screen.

3. The apparatus of claim 1, wherein the gesture on the second screen further includes at least one of a hovering gesture, an input of a key in a terminal, a motion gesture of the terminal, or a user motion detected by infrared rays.

4. The apparatus of claim 1, wherein, upon detecting a hovering gesture above the second screen while information based on a first application is being displayed on the first screen and information based on a second application is being displayed on the second screen, the at least one processor is further configured to control display of the partial information of the first screen hidden by the second screen to be viewable by moving the second screen from a currently displayed area of the second screen.

5. The apparatus of claim 1, wherein, upon detecting a hovering gesture above the second screen while information based on a first application is being displayed on the first screen and information based on a second application is being displayed on the second screen, the at least one processor is further configured to control display of the partial information of the first screen hidden by the second screen to be viewable through the second screen by increasing a transparency of the second screen.

6. The apparatus of claim 1, wherein, while information based on a first application is being displayed on the first screen and information based on a second application is being displayed on the second screen, upon detecting an input gesture on an input window of the first screen, the at least one processor is further configured to:
detect a currently displayed area of the second screen, and
if the second screen is overlapped over the input window or a keypad displayed by the input gesture, control the input window and the keypad not to be overlapped with the second screen by moving the second screen to a position at which the second screen is not overlapped over the input window and the keypad or adjusting a size of the second screen.

7. The apparatus of claim 1, wherein, while information based on at least one application is being displayed separately on a first layer and a second layer lying over the first layer, the at least one processor is further configured to upon detecting a gesture on the second layer, control display of partial information of the first layer hidden by the second layer to be viewable by changing an attribute of the second layer.

8. An apparatus for controlling screens in a device, the apparatus comprising:
a display configured to include a first screen and a second screen overlapped over the first screen; and
at least one processor configured to, while information based on a first application is being displayed on the first screen and information based on a second application is being displayed on the second screen, upon detecting an eye-gaze gesture corresponding to perform a function related to the first screen,
determine whether the eye-gaze gesture is directed toward a display area of the second screen based on coordinates of a position of the eye-gaze gesture,
determine a type of the eye gaze gesture, if the eye-gaze gesture was directed toward the second screen,
control display of partial information of the first screen hidden by the second screen to be viewable by moving the second screen out of a currently displayed area of the second screen while the second screen remains overlapping a portion of the first screen, if the determined type of the eye-gaze gesture is a request for moving the second screen, and
control returning of the second screen to a previous displayed area if a direction of the eye-gaze gesture moves away from the second screen or keep the second screen in a currently displayed area, if the eye-gaze gesture remains directed toward the second screen.

9. The apparatus of claim 8, wherein, if the at least one processor determines that the gesture was directed toward the first screen based on the coordinates of the position of the eye gaze gesture, the at least one processor is further configured to:
control the information based on the first application on the first screen, and
if the determined type of the eye gaze gesture is a command to control the second screen, control the information based on the second application on the second screen.

10. A method of controlling screens in a device, the method comprising:
displaying information based on at least one application separately on first and second screens;
changing an attribute of the second screen, upon detecting a gesture corresponding to performing a function related to the first screen the second screen while the information based on the at least one application separately on the first and second screens, the gesture being at least a user eye-movement directed toward the second screen; and
displaying the second screen that is changed by the changed attribute and partial information of the first screen hidden by the second screen overlapped over the first screen while the user eye-movement remains directed toward the second screen.

11. The method of claim 10, wherein the attribute of the second screen includes at least one of a position, a size, or a transparency of the second screen.

12. The method of claim 10, wherein the gesture on the second screen further includes at least one of a hovering gesture, an input of a key in a terminal, a motion gesture of the terminal, or a user motion detected by infrared rays.

13. The method of claim 10, wherein the displaying of the partial information of the first screen comprises:
displaying information based on a first application on the first screen and displaying information based on a second application on the second screen; and
displaying the partial information of the first screen hidden by the second screen to be viewable by moving the second screen from a currently displayed area of the second screen, upon detecting a hovering gesture above the second screen while the information based on the first application is being displayed on the first screen and the information based on the second application is being displayed on the second screen.

14. The method of claim 10, wherein the displaying of the partial information of the first screen comprises:
displaying information based on a first application on the first screen and displaying information based on a second application on the second screen; and
displaying the partial information of the first screen hidden by the second screen to be viewable through the second screen by increasing a transparency of the second screen, upon detecting a hovering gesture above the second screen while the information based on the first application is being displayed on the first screen and the information based on the second application is being displayed on the second screen.

15. The method of claim 10, further comprising:
displaying information based on a first application on the first screen and displaying information based on a second application on the second screen;
detecting a currently displayed area of the second screen, upon detecting an input gesture on an input window of the first screen while the information based on the first application is being displayed on the first screen and the information based on the second application is being displayed on the second screen; and moving the second screen to a position at which the second screen is not overlapped over the input window and a keypad displayed by the input gesture or adjusting a size of the second screen not to overlap the input window or the keypad with the second screen, if the second screen is overlapped over the input window or the keypad.

16. The method of claim 10, further comprising:

displaying information based on at least one application separately on a first layer and a second layer lying over the first layer; and displaying partial information of the first layer hidden by the second layer to be viewable by changing an attribute of the second layer, upon detecting a gesture on the second layer while the information based on the at least one application is being displayed separately on the first and second layers.

17. A method of controlling screens in a device, the method comprising:

displaying information based on a first application on a first screen and displaying information based on a second application on a second screen overlapped over the first screen;

determining whether an eye-gaze gesture directed toward a display area of the second screen based on coordinates of a position of the eye gaze gesture, upon detecting the eye gaze gesture corresponding to perform a function related to the first screen while the information based on the first application is being displayed on the first screen and the information based on the second application is being displayed on the second screen;

determining a type of the eye gaze gesture, if the eye-gaze gesture was directed toward the second screen;

displaying partial information of the first screen hidden by the second screen to be viewable by moving the second screen out of a currently displayed area of the second screen while the second screen remains overlapping a portion of the first screen, if the determined type of the eye-gaze gesture is a request for moving the second screen; and returning the second screen to a previous displayed area if a direction of the eye-gaze gesture moves away from the second screen or keeping the second screen in a currently displayed area, if the eye-gaze gesture remains directed toward the second screen.

18. The method of claim 17, further comprising;

controlling the information based on the first application on the first screen, if it is determined that the gesture was directed toward the first screen based on the coordinates of the position of the eye-gaze gesture; and controlling the information based on the second application on the second screen, if the determined type of the eye-gaze gesture is a command to control the second screen.

* * * * *